May 7, 1957 — A. A. GERICKE — 2,791,036
LIQUID LEVEL
Filed Feb. 7, 1956 — 2 Sheets-Sheet 2
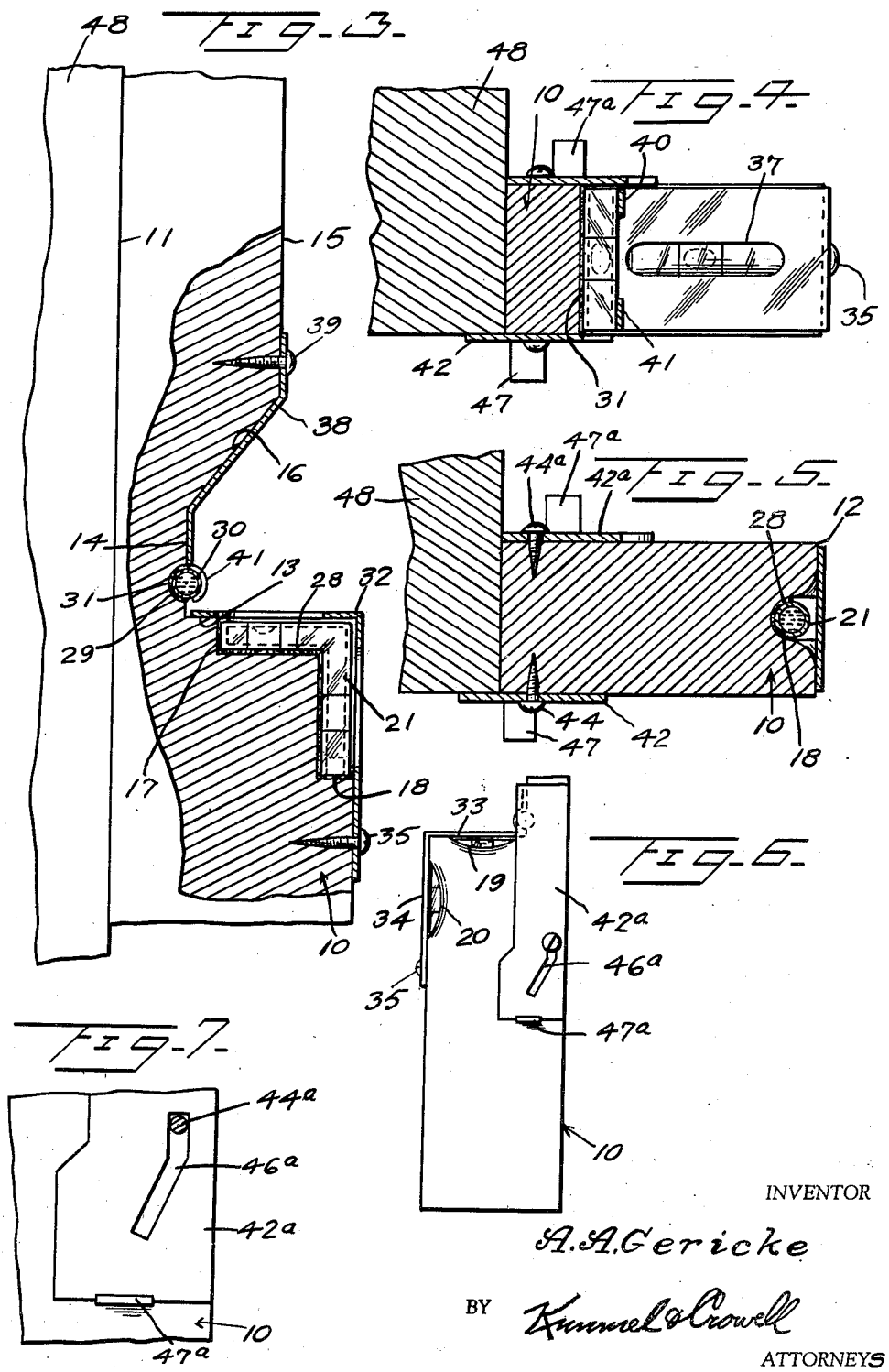

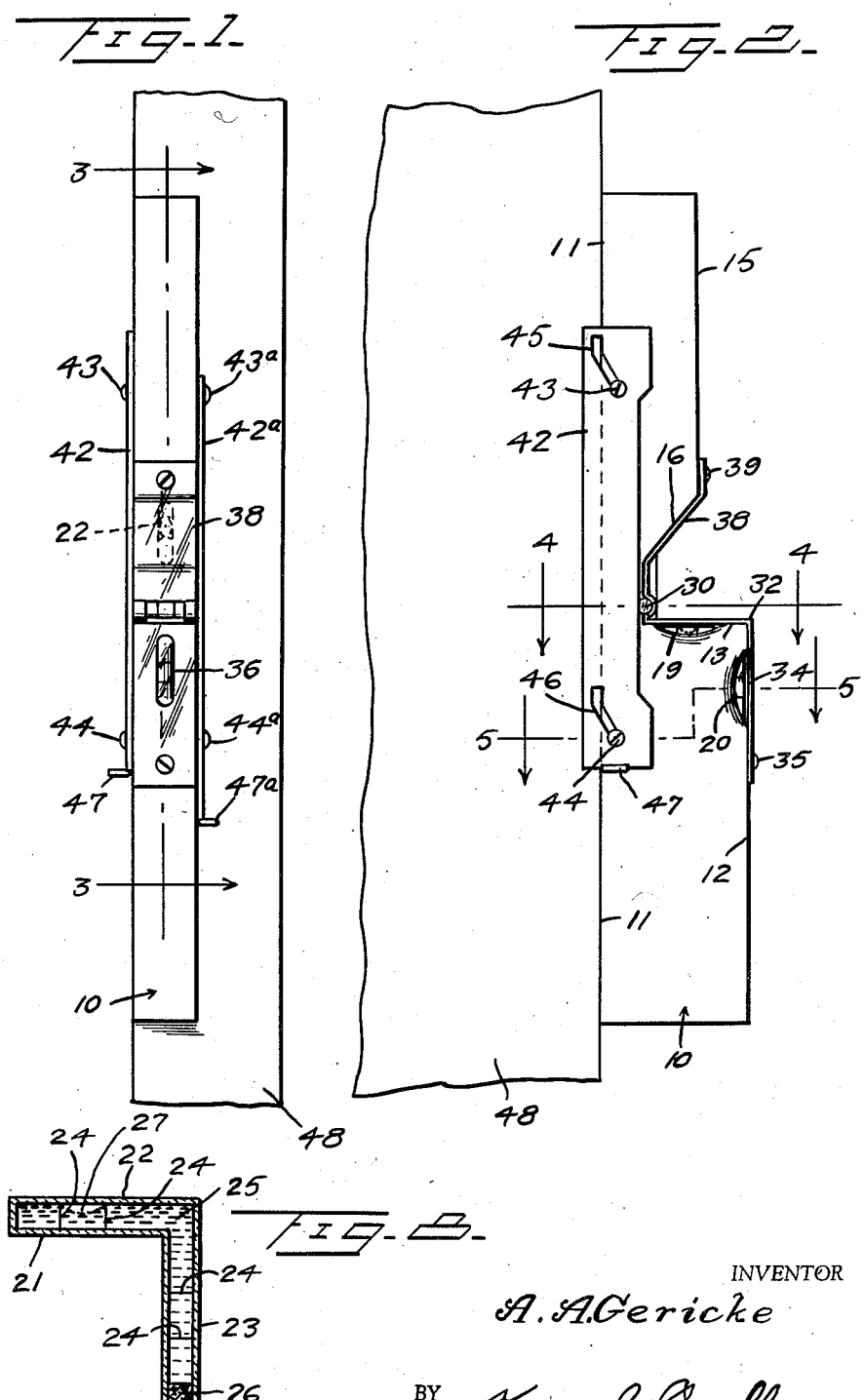

United States Patent Office 2,791,036
Patented May 7, 1957

2,791,036

LIQUID LEVEL

Alexander A. Gericke, Los Angeles, Calif.

Application February 7, 1956, Serial No. 563,889

1 Claim. (Cl. 33—212)

The present invention relates to liquid levels, and more particularly, to liquid levels which are adapted to be used on vertical as well as horizontal surfaces.

The primary object of the invention is to provide a liquid level for simultaneously leveling the edge and face of an object such as a door, while it is being hung, a 2 x 4 stud being erected, or simply leveling a horizontal object.

Another object of the invention is to provide a liquid level having means to permit the simultaneous sight of two separated indicators.

A further object of the invention is to provide a liquid level of the class described above having retractible flanges for engaging the face of a door while the base of the level is engaging the edge of the door.

A still further object of the invention is to provide a liquid level incorporating reflecting means therein to permit the reading of the liquid level from a point in axial alignment with the level.

Another object of the invention is to provide a liquid level structure of the class described above which will be inexpensive to manufacture, easy and accurate to use, and adapted to most leveling operations.

Other objects and advantages will become apparent in the following specification when considered in the light of the attached drawings, in which:

Figure 1 is a fragmentary front elevation of a door edge with the invention engaged thereagainst.

Figure 2 is a fragmentary side elevation of the construction illustrated in Figure 1.

Figure 3 is a partial vertical cross-section taken along the line 3—3 of Figure 1, looking in the direction of the arrows.

Figure 4 is a transverse cross-section taken along the line 4—4 of Figure 2, looking in the direction of the arrows.

Figure 5 is a fragmentary transverse cross-section taken along the line 5—5 of Figure 2, looking in the direction of the arrows.

Figure 6 is a fragmentary side elevation of the liquid level illustrating the flange construction.

Figure 7 is an enlarged detailed side elevation of the flange mounting.

Figure 8 is a vertical cross-section taken through one of the liquid level tubes.

Referring now to the drawings in detail wherein like reference numerals indicate like parts throughout the several figures, the reference numeral 10 indicates generally a level body formed of wood or any other suitable material. The level body 10 is provided with a longitudinal edge 11 extending continuously from one end of the level 10 to the other. An edge 12 extends parallel to the edge 11 from one end of the level 10 to a point approximately mid-way of the length of the level 10.

A wall 13 extends perpendicularly inwardly from the edge 12 toward the edge 11. A surface 14 parallel to the edge 11 and spaced apart therefrom, extends from the wall 13. An edge 15 extends inwardly from the end of the level opposite the edge 12 in parallel relation to the edge 11, and the space between the edge 11 and the edge 15 being somewhat less than the distance between the edges 11 and 12.

An angularly offset wall 16 extends inwardly from the edge 15 to intersect the surface 14 at a point spaced from the wall 13. A groove 17 is formed in the wall 13 and intersects a groove 18 formed in the edge 12. The wall 13 adjacent the central portion of the groove 17 is flared downwardly as at 19 in a conventional manner. The edge 12 adjacent the center of the groove 18 is flared downwardly at 20 in a conventional manner.

A bubble level tube 21 having right angularly extending portions 22 and 23 is formed with level indicating lines 24 and filled with a liquid 25. A seal 26 closes the open end of the tube 21 to retain the liquid 25 therein. Air forming a bubble 27 is trapped in the tube 21 and is adapted to cooperate with the indicator lines 24 in either arm 22 or 23 depending upon the position of the level 10. The level tube 21 is positioned in the grooves 17 and 18 as illustrated in Figure 3 with the arm 22 lying in the groove 17 and the arm 23 lying in the groove 18. The tube 21 is secured in the grooves 17 and 18 by means of cement 28.

A transversely extending groove 29 is formed across the surface 14 and carries a liquid level tube 30 therein. Cement 31 secures the liquid level tube 30 in the groove 29.

A metal retainer plate 32 is positioned over the liquid level tube 21 and is provided with right angularly extending arms 33 and 34. The retainer plate 32 is secured to the level 10 by means of a securing element 35. The retainer plate 32 is provided with an aperture 36 overlying the arm 23 of the tube 21 and with an aperture 37 overlying the arm 22 of the tube 21.

A second retainer plate 38 is secured to the edge 15 by retainer element 39 and is bent to extend over the wall 16 and the surface 14 with the lower end thereof having a pair of arcuate clips 40 and 41 engaging over the tube 30. The retainer plate 38 is highly polished and serves as a mirror to reflect an image of the arm 22 of the tube 21 as illustrated in Figure 1 to permit the horizontal bubble therein to be viewed from eye level.

A retractible flange 42 is secured to one of the sides of the level 10 by means of pins 43 and 44. Cam slots 45 and 46 are formed in the flange 42 and engage the pins 43 and 44 respectively. A handle 47 is used to move the flange 42 on the pins 43 and 44 to cause the flange 42 to be extended or retracted as the case may be. The opposite face of the level bar 10 is provided with a retractible flange 42a which is mounted to the level 10 by means of pins 43a and 44a extending through the flange 42a. A handle 47a serves to move the flange 42a to adjust it in the same manner as the flange 42 is adjusted.

In the use and operation of the invention, the level 10 has one of the flanges 42, 42a retracted and the other extended as illustrated in Figures 1 and 2 so that one of the flanges 42, 42a will engage a face of an object to be checked such as a door 48 while the longitudinal edge 11 engages the edge of the object to be checked so that the level 10 is aligned with both surfaces thereof. The level tube 30 can then be read directly to align one surface while the reflection of the arm 22 of the tube 21 can be viewed in the retainer 38 to align the edge surface.

Should it be desirable to engage the opposite surface of the object, the retractible flange 42 or 42a on the opposite face of the level 10 is utilized. In situations requiring the use of the level on horizontal surfaces both flanges 42 and 42a are retracted and the longitudinal edge 11 is placed on the surface to be leveled so that the bubble in the arm 23 of the tube 21 and the bubble in the tube 30 can be read directly.

Having thus described the preferred embodiment of the invention, it should be understood that numerous modifications and structural adaptations may be resorted to without departing from the scope of the appended claims.

What is claimed is:

A liquid level comprising an elongated bar having an aligning surface formed thereon, said bar having a notch formed therein intermediate the ends thereof oppositely of said aligning surface, a liquid level tube having a pair of right angularly extending arms secured to said bar with one of said arms positioned along one longitudinal edge of said bar and the other of said arms extending into the notch formed in said bar, a second liquid level tube positioned transversely on said bar at the base of said notch perpendicularly to the arm of said first liquid level tube extending into said notch, a reflector mounted in said notch adjacent said second liquid level tube at an angle of substantially 45 degrees to the axis of said arm extending into said notch for facilitating the simultaneous viewing of said first and said second liquid level tubes, a flange positioned against the side of said bar perpendicular to said aligning surface, said flange having a pair of elongated cam slots formed therein, and means on said bar extending through said cam slots for securing said flange to said bar for sliding movement, said cam slots acting to extend and retract said flange with relation to said aligning surface on sliding movement of said flange.

References Cited in the file of this patent

UNITED STATES PATENTS

| | | |
|---|---|---|
| 182,801 | Burlington et al. | Oct. 3, 1876 |
| 585,653 | Clowe | July 6, 1897 |
| 1,788,256 | Sherwin | Jan. 6, 1931 |
| 1,855,394 | Hill | Apr. 26, 1932 |
| 2,466,829 | Sprinkel | Apr. 12, 1949 |
| 2,727,314 | Dossie et al. | Dec. 20, 1955 |